United States Patent [19]

Williamson

[11] 4,242,866
[45] Jan. 6, 1981

[54] BY-PASS VALVE

[75] Inventor: Raymond E. Williamson, Granite City, Ill.

[73] Assignee: ACF Industries, Incorporated, New York, N.Y.

[21] Appl. No.: 960,059

[22] Filed: Nov. 13, 1978

[51] Int. Cl.³ .............................................. F01N 3/15
[52] U.S. Cl. ...................................... 60/290; 60/306
[58] Field of Search ................................ 60/290, 306

[56] References Cited

U.S. PATENT DOCUMENTS

| | | | |
|---|---|---|---|
| 3,479,816 | 11/1969 | Masters | 60/290 |
| 3,906,723 | 9/1975 | Matumoto | 60/290 |
| 4,178,755 | 12/1979 | Klimazewski | 60/290 |
| 4,178,953 | 12/1979 | White | 60/290 |

*Primary Examiner*—Douglas Hart
*Attorney, Agent, or Firm*—J. Joseph Muller

[57] ABSTRACT

An improved by-pass valve (1) for use in an automobile exhaust system (ES) comprises an air inlet (7) connected to an air pump (AP), first and second air outlets (15,23) respectively connected to first and second portions (P1,P2) of a catalytic converter (CC) and a third outlet (33) through which air is dumped to atmosphere. Air is directed from the inlet to the first outlet when engine temperature is less than a predetermined value and from the inlet to the second outlet when engine temperature reaches the predetermined value. A first and normally closed valve (81) is intermediate the air inlet and the first and second outlets and a second and normally open valve (83) is intermediate the air inlet and the third outlet. The first valve is opened and the second valve closed when engine vacuum exceeds a predetermined level so air flows to either the first or second outlet. The second valve is reopened whenever the outlet to which air is directed is blocked so air is dumped to atmosphere. To accomplish this, the first valve is mounted on the first section (111) of a split shaft (109) and the second valve is mounted on a second shaft section (113). The sections are movable in unison to open the first valve, but the second section is movable relative to the first section when a blockage occurs to reopen the second valve.

8 Claims, 4 Drawing Figures

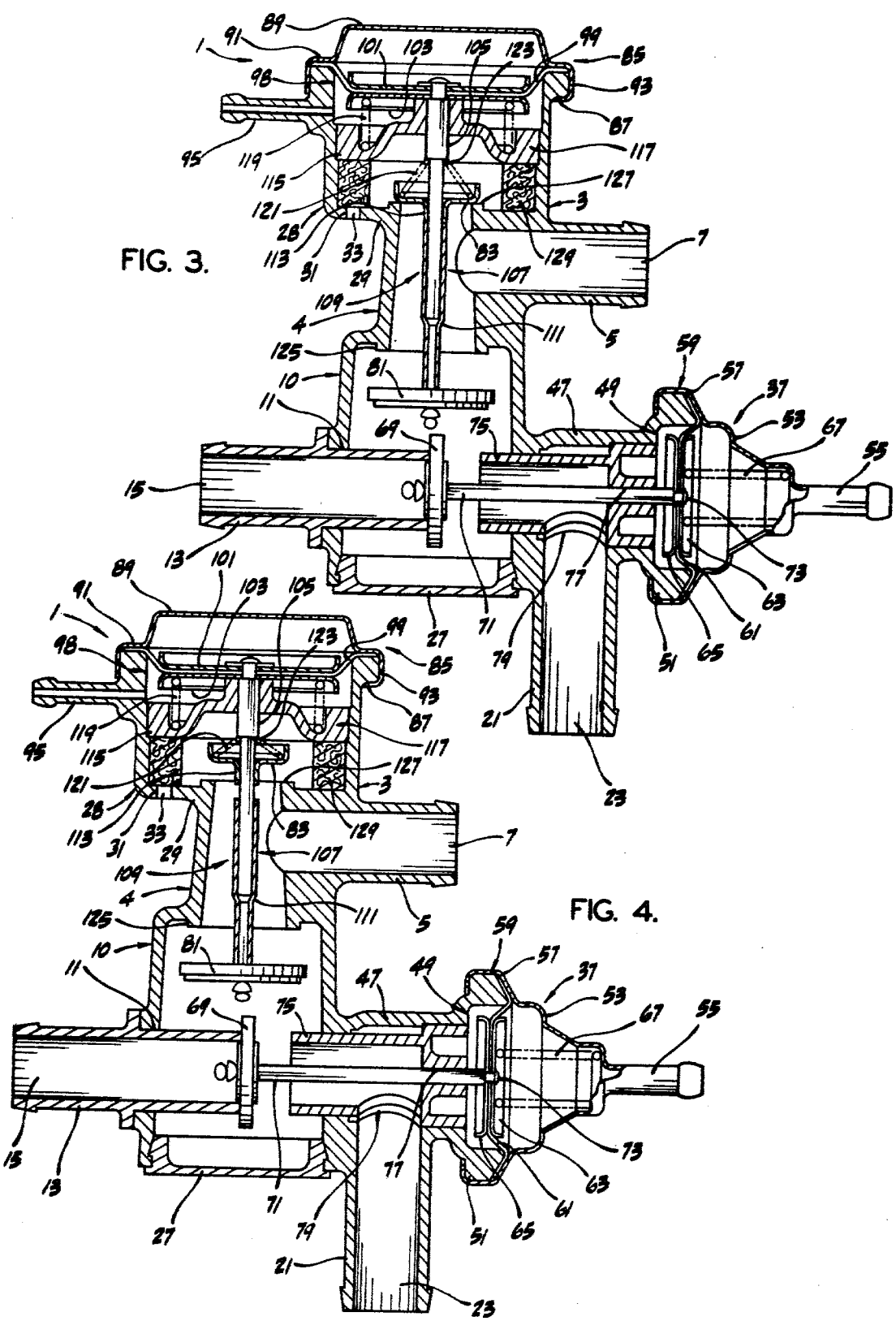

BY-PASS VALVE

BACKGROUND OF THE INVENTION

This invention relates to by-pass valves for use in the exhaust system of an automobile engine and, more specifically, to an improved by-pass valve incorporating overpressure protection.

With increasing use of catalytic converters, the system for introducing additional air into the converter at appropriate points and times, in order to obtain more complete combustion of the fuel and reduced emissions, has been modified to include a two-way switch valve. For the sake of convenience, cost, and space requirements in the engine compartment, the switch valve has been incorporated in the by-pass valve previously used in engine exhaust systems. The by-pass valve has been redesigned to accomplish this and a number of problems have arisen. One problem encountered involves overpressure protection in the event the selected switch valve output is blocked for some reason. When this occurs, it is necessary to dump air entering the by-pass valve to atmosphere or else the air pump used with the valve may be damaged or destroyed which will adversely effect operation of the catalytic converter.

SUMMARY OF THE INVENTION

Among the several objects of the present invention may be noted the provision of an improved by-pass valve in which a by-pass valve and switch valve are combined in a single housing; the provision of such an improved by-pass valve which is responsive to the occurrence of a blockage in the exhaust system to dump air entering the valve to atmosphere thereby to protect an air pump used with the valve from damage; and the provision of such an improved by-pass valve which is further responsive to the cessation of a blockage to resume normal operation whereby air is supplied to the appropriate portions of the exhaust system to aid in reducing engine emissions.

Briefly, an improved by-pass valve for use in the exhaust system of an automobile engine, the exhaust system having a catalytic converter and the engine having an air pump, comprises an air inlet connected to the air pump, first and second air outlets respectively connected to first and second portions of the catalytic converter, and a third outlet through which air is dumped to atmosphere. Means responsive to the operating temperature of the engine directs air from the inlet to the first outlet when engine temperature is less than a predetermined value and from the inlet to the second air outlet when engine temperature reaches the predetermined value. A first and normally closed valve is intermediate the air inlet and the first and second outlets and a second and normally open valve is intermediate the air inlet and the third outlet. Means responsive to the engine vacuum level opens the first valve and closes the second valve when engine vacuum exceeds a predetermined level whereby air flows from the inlet to either the first or second outlet. The vacuum responsive means includes means responsive to a blockage of the first or second outlet to reopen the second valve so air from the inlet is dumped to atmosphere. The blockage responsive means comprises a split shaft having a first section on which the first valve is mounted and a second section on which the second valve is mounted, the first and second shaft sections being movable in unison when the first valve is opened, but the second shaft section being movable relative to the first shaft section when a blockage occurs thereby to reopen the second valve. Other objects and features will be in part apparent and in part pointed out hereinafter.

BRIEF DESCRIPTION OF THE DRAWINGS

FIG. 3 illustrates operation of the improved by-pass valve under normal operating conditions; and FIG. 4 illustrates operation of the improved by-pass valve when a blockage in the exhsust system occurs to dump inlet air to atmosphere.

Corresponding reference characters indicate corresponding parts throughout the several views of the drawings.

DESCRIPTION OF A PREFERRED EMBODIMENT

Figure 1:
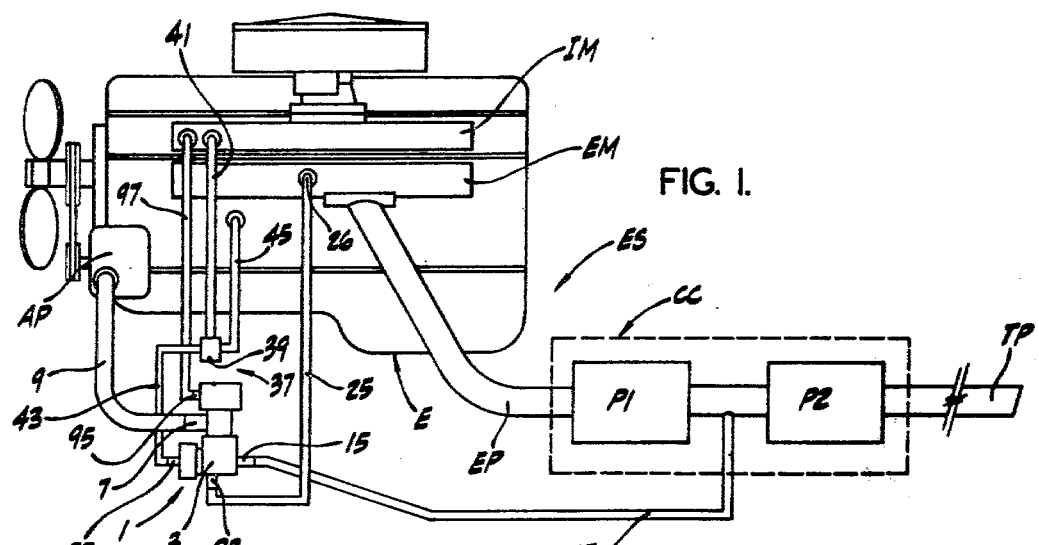
FIG. 1 is a schematic representation of an automotive exhaust system including an improved by-pass valve of the present invention.

Referring to the drawings, an improved by-pass valve of the present invention is indicated generally 1 and is for use in the exhaust system ES of an automobile engine E. The exhaust system includes an exhaust manifold EM, an exhaust pipe EP, a catalytic converter CC, and a tail pipe TP, all of which are well known in the art. The catalytic converter is, for example, a three-way converter and is shown as having two portions P1 and P2 respectively. Such a converter is commonly referred to as a dual bed catalyst with portion P1 being the three-way catalytic converter and portion P2 an oxidizing section. Engine E has an associated air pump AP which is driven by the engine.

Valve 1 comprises a generally cylindrical housing or valve assembly 3 which is molded out of a lightweight synthetic resin material. The housing has a hollow central section 4 forming a main air passage through the housing. A nipple 5 is integrally formed with the central section and defines an air inlet 7 connected to an outlet of the air pump by a suitable air hose or conduit 9. At the lower end of central section 4 is an enlarged diameter section 10 in which is formed a circular opening 11. A nipple 13 is sonically welded into opening 11 and defines an air outlet 15. Outlet 15 is connected to portion P2 of the catalytic converter by a hose 17. The portion of housing 3 opposite opening 11 projects outwardly and a second nipple 21 is integrally formed in the side of this projection and defines an air outlet 23. This air outlet is connected to portion P1 of the catalytic converter by a hose 25 which attaches to an air inlet 26 in the exhaust manifold. The lower open end of housing section 10 is closed by a cover plate 27.

The housing also has an enlarged diameter section 28 at the upper end of central section 4, the diameter of this upper section being somewhat larger than that of the rest of the housing. Section 27 has a bottom wall 29 in which an opening 31 is formed. This opening defines a third air outlet 33 through which air from the inlet is dumped to the atmosphere. It will be understood that a plurality of spaced openings 31 are formed in bottom wall 29 for air to be discharged to the atmosphere.

Means generally designated 37 is responsive to the operating temperature of engine E for directing air from inlet 7 to outlet 15 when engine temperature is less than a predetermined value and from the inlet to outlet 23 when engine temperature reaches the predetermined value. A thermostatically controlled valve 39 has an inlet connected to an intake manifold IM of engine E via a conduit 41. The outlet of valve 39 is connected to a conduit 43 and the opening and closing of the valve is controlled by the temperature of water circulating through the engine. Engine temperature is sensed via a control line 45. When engine water temperature is less than a predetermined value, valve 39 is closed but the valve opens when the predetermined temperature is sensed. Upon opening of valve 39, the by-pass valve is exposed to engine vacuum via lines 41 and 43.

The outwardly projecting portion of the lower section of housing 3 is designated 47. The outer end of projection 47 has an enlarged diameter section defining a part of a chamber 49 and the surface of the outer end of the projection has an annular rim 51. A one-piece, thin-wall housing 53 of sheet metal construction fits over the end of projection 47 and defines the remainder of chamber 49. Housing 53 is cup-shaped and has a nipple 55 at its base. Conduit 43 is attached to nipple 55 so chamber 49 is exposed to engine vacuum when valve 39 opens. Housing 53 has an outwardly extending annular flange 57 which is crimped over rim 51 as indicated at 59.

A flexible diaphragm 61 is annular shaped and its outer margin is clamped between rim 51 and flange 57 to provide an air tight seal around the margin. The diaphragm is sandwiched between a pair of backing plates, 63 and 65 respectively. The outer margin of each backing plate is turned outwardly and a compression spring 67 seats against the outer surface of backing plate 63 and the base of housing 53. A valve 69 is hingedly connected to one end of a valve stem 71 and the other end of the valve stem is attached to the diaphragm assembly. The attachment of the valve stem to the assembly is accomplished by any of the methods well known in the art, e.g. by a pin 73. A cylindrical sleeve 75 is press fit into projection 47 of housing 3. The inner end of the sleeve serves as a valve seat for valve 69. The outer end of the sleeve is closed except for a central opening 77 which functions as a guide for stem 71. The sleeve is installed so the outer surface of the closed end of the sleeve is flush with the rear wall of chamber 49. The sleeve further has an opening 79 intermediate its ends and the sleeve is installed with this opening in registry with second air outlet 23.

Figure 2:
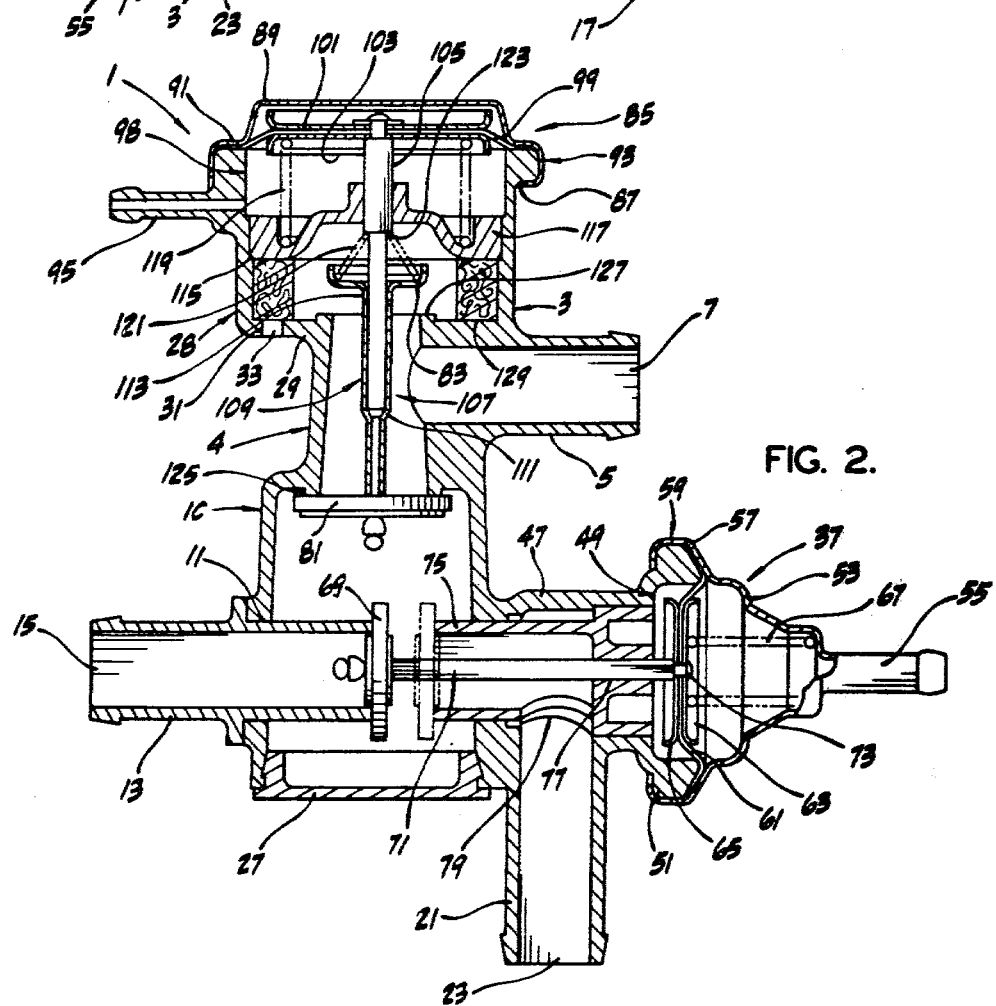
FIG. 2 is a side elevational view, in section, of an improved by-pass valve of the invention.

In operation, spring 67 urges diaphragm 61 to the left as viewed in FIG. 2 to seat valve 69 against the inner end of nipple 13, thus closing air outlet 15 and opening air outlet 23. This permits inlet air to be directed to portion P1 of converter CC. When the temperature of engine E reaches the predetermined value, valve 39 is opened and diaphragm 61 is exposed to engine vacuum. The diaphragm moves to the right, against the force of spring 67, pulling valve 69 away from the inner end of nipple 13 and seating it against the inner end of sleeve 75. This is the dashed line configuration of valve 69 shown in FIG. 2. This movement opens air outlet 15 and closes air outlet 23. Inlet air is now supplied to portion P2 of the catalytic converter via line 17.

A normally closed valve 81 is intermediate air inlet 7 and outlets 15 and 23 and a normally open valve 83 is intermediate the inlet and outlet 33. This latter valve is a pressure relief valve. A means generally designated 85 is responsive to engine vacuum for opening valve 81 and closing valve 83 when engine vacuum exceeds a predetermined level. This allows air to flow from inlet 7 to either outlet 15 or 23. The upper end of housing section 28 is turned outwardly to form an annular rim 87. A cup-shaped housing 89 of one-piece, thin-wall sheet metal construction has an outwardly extending annular flange 91 which is crimped over rim 87, as indicated at 93, to cap this end of the by-pass valve. Housing 89 and section 28 of assembly 3 together comprise means defining a chamber 98. A nipple 95 is integrally formed in the sidewall of housing section 28 and is connected to an air outlet of intake manifold IM by an air hose or conduit 97.

Vacuum responsive means 85 further comprises a flexible diaphragm 99 one side of which is exposed to engine vacuum. The diaphragm is annular shaped and its outer margin is clamped between rim 87 and flange 91, thus creating an air tight seal around the margin. A pair of backing plates 101 and 103 respectively abut opposite sides of the diaphragm to form a movable assembly. A center shaft or valve stem 105 secured to the diaphragm assembly in any conventional manner for movement with the assembly.

Means 85 includes a means 107 responsive to a blockage of outlet 15 or outlet 23 (whichever outlet inlet air is directed to) to open valve 83 (if it is closed) so air from the inlet is dumped to the atmosphere. Means 107 includes a split shaft 109 having a first section 111 on which valve 81 is mounted and a second section 113 on which valve 83 is mounted. Preferably, valve 83 is integrally formed with the second section of shaft 109. Shaft 109 fits over center shaft 105 and is concentric therewith. The inner wall of housing section 27 has a circumferential shoulder 115 and an annular separator 117 abuts against this shoulder. The separator has an outwardly turned flange and a central opening. The inner margin of the separator about the central opening is outwardly turned to form a cylindric guide for stem 105. A compression spring 119 seats against the bottom of separator 117 and bears against the outer surface of backing plate 103 to urge diaphragm 99 upwardly. The diameter of shaft 105 is reduced at a point somewhat above the upper end of split shaft 109 and a compression spring 121 seats against a shoulder 123 formed at this point. Valve 83 is disk shaped and its outer flange is upwardly turned. The lower end of spring 121 bears against the upper surface of valve 83 and urges split shaft section 113 into abutment with shaft section 111.

In operation, valve 81 is, as noted, normally closed and seats against a rim 125 formed around the lower end of the passage in central section 4. Valve 83 is spaced apart from a rim 127 formed around the upper end of this passage so as to be open and allow inlet air to dump to atmosphere through outlet 33. The underside of diaphragm 99 is exposed to engine vacuum and when the engine vacuum level reaches a predetermined value, the diaphragm assembly flexes downwardly closing valve 83 and opening valve 81. This is the condition shown in FIG. 3. During this movement, split shaft sections 111 and 113 move in unison.

With valve 81 open and valve 83 closed, a blockage created in the flow path from either outlet 15 or 23 results in an overpressure condition in the by-pass valve. To prevent damage to the air pump AP, the pressure acting on the bottom side of valve 83 forces it upward against the force of spring 121 and split shaft section 113 moves upward while section 111 remains stationary. This is the situation shown in FIG. 4. The relative movement of section 113 to section 111 results in valve 83 reopening and inlet air is dumped to the atmosphere through outlet 33. Shaft section 111 remains in place and valve 81 remains open as shown in FIG. 4. When the overpressure condition terminates, spring 121 urges split shaft 113 downward until it again abuts section 111. This movement recloses valve 83. If the engine vacuum level falls below the predetermined value, spring 119 forces diaphragm 99 upward to close valve 81 and open valve 83.

As shown in the drawings, the air inlet, three air outlets, valves 81 and 83, temperature sensitive means 37 and vacuum responsive means 85 are all contained in housing 3, thus simplifying the air by-pass system. Housing 3 is designed to be lightweight and compact, thus to conserve weight and reduce space in an automobile's engine compartment. Further suitable noise deadening material such as that indicated at 129 may be placed in the housing adjacent air outlets 33 to muffle sounds produced in the valve.

In view of the above, it will be seen that the several objects of the invention and other advantageous results are achieved.

As various changes could be made in the above construction without departing from the scope of the invention, it is intended that all matter contained in the above description or shown in the accompanying drawings shall be interpreted as illustrative and not in a limiting sense.

I claim:

1. An improved by-pass valve for use in the exhaust system of an automobile engine, the exhaust system having a catalytic converter and the engine having an air pump, the by-pass valve comprising:

an air inlet connected to the air pump;

first and second air outlets respectively connected to first and second portions of the catalytic converter;

a third outlet through which air from the inlet is dumped to the atmosphere;

means responsive to the operating temperature of the engine for directing air from the inlet to the first outlet when engine temperature is less than a predetermined value and from the inlet to the second outlet when engine temperature reaches the predetermined value;

a first and normally closed valve intermediate the air inlet and the first and second outlets;

a second and normally open valve intermediate the air inlet and the third outlet; and means responsive to the engine vacuum level for opening the first valve and closing the second valve when engine vacuum exceeds a predetermined level whereby air flows from the inlet to either of the first and second outlets, the vacuum responsive means including means responsive to a blockage of whichever of the first or second outlets air from the inlet is directed to for reopening the second valve whereby air from the inlet is dumped to the atmosphere, the blockage responsive means comprising a split shaft having a first section with which the first valve is integrally connected and a second section with which the second valve is integrally connected, the first and second shaft sections being movable in unison to open the first valve, but the second shaft section being movable relative to the first shaft section when said blockage occurs thereby to reopen the second valve.

2. A by-pass valve as set forth in claim 1 wherein the vacuum responsive means comprises means defining a chamber, a diaphragm positioned in the chamber and exposed to engine vacuum, and a center shaft one end of which is connected to the diaphragm and movable therewith.

3. A by-pass valve as set forth in claim 2 wherein the split shaft fits over the center shaft and is concentric therewith.

4. A by-pass valve as set forth in claim 3 further comprising means urging the first and second split shaft sections into abutment whereby the shaft sections are movable in unison to open the first valve.

5. A by-pass valve as set forth in claim 4 wherein the urging means comprises a spring seated on the center shaft and acting on the second valve.

6. A by-pass valve as set forth in claim 1 wherein the second shaft section and second valve are integrally formed.

7. A by-pass valve as set forth in claim 1 wherein the air inlet, three air outlets, first and second valves, the temperatures responsive means and vacuum responsive means are all contained in a single housing.

8. A by-pass valve as set forth in claim 1 wherein the housing is a lightweight, synthetic resin material.

* * * * *